US012779394B1

(12) United States Patent
Johnson

(10) Patent No.: US 12,779,394 B1
(45) Date of Patent: Nov. 3, 2026

(54) TENSION-AMPLIFIED CARBON DIOXIDE CAPTURE

(71) Applicant: Eidon, LLC, Mercer Island, WA (US)

(72) Inventor: Roger N. Johnson, Mercer Island, WA (US)

(73) Assignee: Eidon, LLC, Mercer Island, WA (US)

(*) Notice: Subject to any disclaimer, the term of this patent is extended or adjusted under 35 U.S.C. 154(b) by 0 days.

(21) Appl. No.: 19/446,070

(22) Filed: Jan. 12, 2026

(51) Int. Cl.
*B01D 53/18* (2006.01)
*B01D 53/14* (2006.01)

(52) U.S. Cl.
CPC ......... *B01D 53/18* (2013.01); *B01D 53/1418* (2013.01); *B01D 53/1425* (2013.01); *B01D 53/1475* (2013.01); *B01D 2257/504* (2013.01)

(58) Field of Classification Search
None
See application file for complete search history.

(56) References Cited

U.S. PATENT DOCUMENTS 4,170,262 A * 10/1979 Marcus ................. F28D 15/046 138/40
5,969,736 A * 10/1999 Field .................... B41J 2/17556 347/85
6,227,288 B1 * 5/2001 Gluck ................... F28D 15/043 165/911
6,533,029 B1 * 3/2003 Phillips ................. F28D 15/043 165/104.33
6,666,909 B1 * 12/2003 TeGrotenhuis ......... B01B 1/005 95/55
6,875,247 B2 * 4/2005 TeGrotenhuis ......... B01B 1/005 261/153
7,828,046 B2 * 11/2010 Huang .................... B22F 5/106 165/104.33
8,438,873 B2 * 5/2013 TeGrotenhuis .......... B01D 3/14 62/495
11,408,684 B1 * 8/2022 Richard .............. F28D 15/0266
11,608,937 B2 * 3/2023 Bevard ...................... F17C 7/04
12,521,671 B1 1/2026 Johnson
2002/0017196 A1 * 2/2002 Lichon ............... B01D 19/0031 96/179
2011/0120451 A1 * 5/2011 Miles ...................... F24S 70/10 126/714
2015/0143818 A1 * 5/2015 Eckhoff .............. F28D 15/0275 62/3.2

(Continued)

OTHER PUBLICATIONS

Vesala, Timo, et al. "Effect of leaf water potential on internal humidity and CO2 dissolution: reverse transpiration and improved water use efficiency under negative pressure." Frontiers in plant science 8 (2017): 54, 10 pages.

*Primary Examiner* — Dung H Bui
(74) *Attorney, Agent, or Firm* — FREESTONE INTELLECTUAL PROPERTY LAW PLLC; Aaron J. Visbeek

(57) ABSTRACT

A structure includes wick microstructure pores, diode microstructure-pores, a rewetting zone, and a catch chamber. The diode microstructure-pores are sized smaller than the wick microstructure-pores. The rewetting zone including desorption microstructure-pores sized larger than the diode microstructure-pores. The catch chamber encloses a textured desorption end of the rewetting zone. The textured desorption end of the rewetting zone is configured to induce gas desorption of a gas from the liquid into the catch chamber.

15 Claims, 11 Drawing Sheets

100

(56) References Cited

U.S. PATENT DOCUMENTS

| | | | | |
|---|---|---|---|---|
| 2021/0340016 | A1* | 11/2021 | Miyahara | B01D 67/0051 |
| 2022/0117345 | A1 | 4/2022 | Lu | |
| 2026/0027550 | A1* | 1/2026 | Schütz | B01J 20/183 |

* cited by examiner

3D MICROSTRUCTURE 157

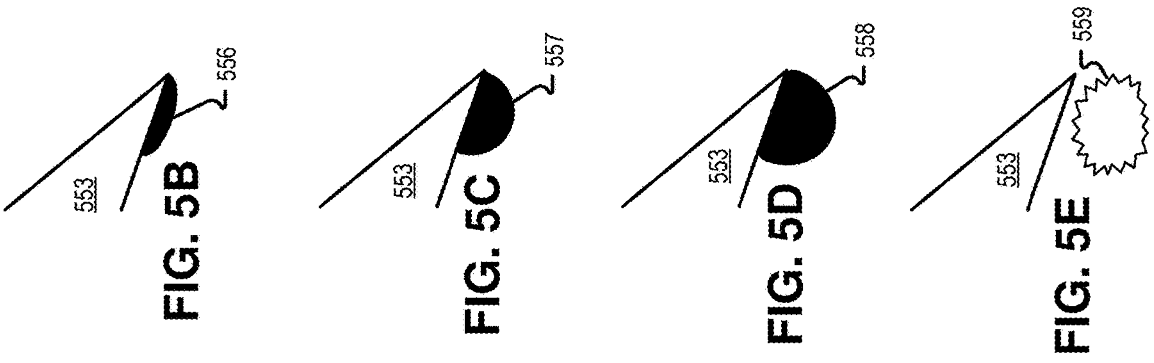
FIG. 5B
FIG. 5C
FIG. 5D
FIG. 5E
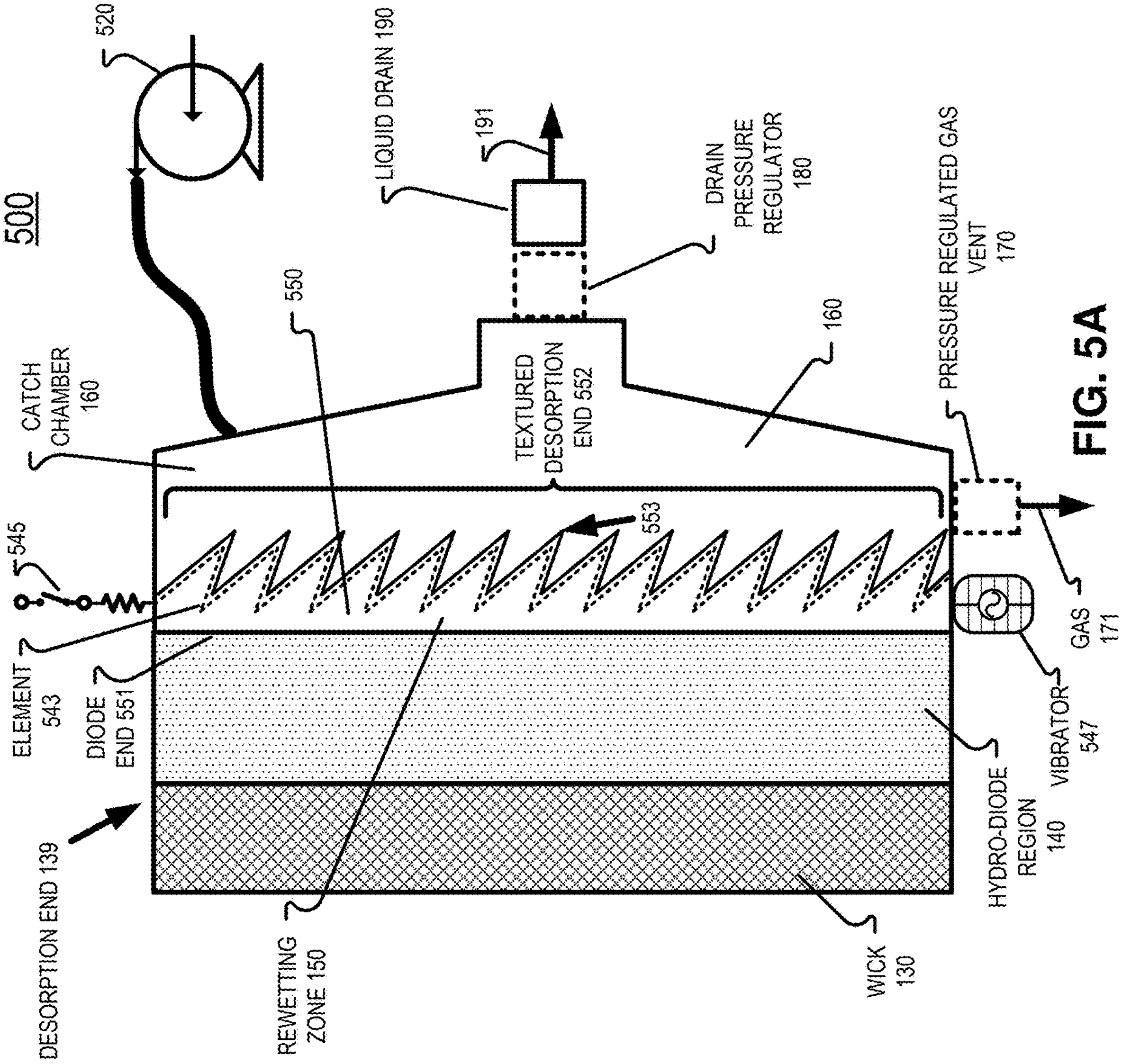
FIG. 5A

DESORPTION OF CARBON DIOXIDE

TENSION-AMPLIFIED CARBON DIOXIDE CAPTURE

TECHNICAL FIELD

This disclosure relates generally to carbon capture, and in particular to carbon dioxide absorption into liquids.

BACKGROUND INFORMATION

Carbon capture techniques are being developed to remove carbon dioxide from the atmosphere. Carbon capture is one way to offset emissions from industrial or recreational activities, for example. The carbon capture industry includes Carbon Capture and Storage (CCS) as well as Direct Air Capture (DAC) techniques. It is desirable to reduce costs and increase efficiency of carbon capture processes.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 5A illustrates a block diagram of a portion of an example desorption structure configured to separate gas from liquid at a textured desorption end of the rewetting zone, in accordance with aspects of the disclosure.

FIGS. 5B-5E illustrates various phases of a liquid droplet along a sawtooth structure, in accordance with aspects of the disclosure.

DETAILED DESCRIPTION

Embodiments of carbon dioxide absorption into liquids are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Many different carbon capture and carbon mitigation techniques are being attempted and industrialized. These efforts include Carbon Capture and Storage (CCS), Direct Air Capture (DAC), Mineral Carbonation, and Enhanced Oil Recovery, for example. However, none of these techniques are particularly energy efficient. Even carbon capture techniques that leverage local geo-thermal energy could be significantly more efficient.

In implementations of the disclosure, carbon dioxide absorption in liquid (e.g. water or glycol) is enhanced by providing a liquid to a wick and absorbing carbon dioxide into the liquid while the liquid, placed under tension, propagates through the wick. The techniques in the disclosure of absorbing gas into liquid may be "super-Henry" absorption in that the liquid holds a significantly higher concentration of gas than Henry's Law would predict for that specific pressure. Gas desorption of the carbon dioxide in the liquid is induced at a texturized desorption structure that is hydraulically coupled to the wick. From the texturized desorption structure, the carbon dioxide is desorbed into a catch chamber and may be directed to a gas storage container coupled to the catch chamber. The liquid in the catch chamber may also be directed to a liquid storage container since the carbon dioxide has been desorbed from the liquid. The liquid may be a polar liquid, which exhibits exceptionally high absorption rates. While this disclosure describes carbon dioxide as an example gas for absorption into liquid, in some implementations, other gases may be absorbed using tension absorption techniques described herein. These and other embodiments are described in more detail in connection with FIGS. 1A-12.

Figure 1A:
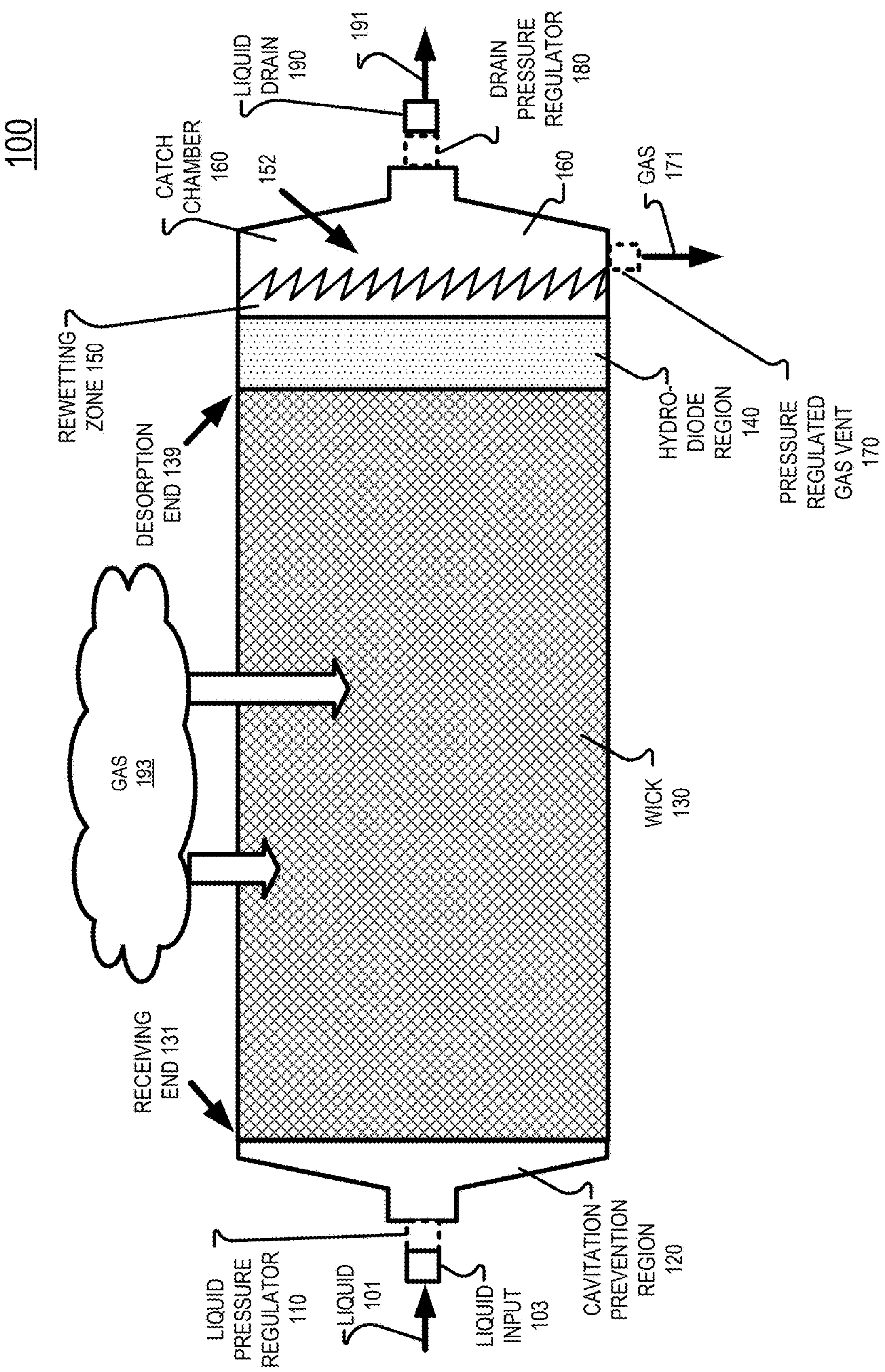
FIG. 1A illustrates a carbon dioxide absorption structure, in accordance with aspects of the disclosure.

FIG. 1A illustrates a carbon dioxide absorption structure 100, in accordance with aspects of the disclosure. Structure 100 is configured to facilitate the absorption of gas 193 into liquid 101 and then separate the absorbed gas from the liquid in a catch chamber 160.

Liquid 101 enters the structure 100 via liquid input 103. Liquid input 103 directs liquid 101 into liquid pressure regulator 110. Liquid pressure regulator 110 is configured to regulate the pressure of liquid 101 before the liquid 101 proceeds to downstream components. Liquid pressure regulator 110 may be configured to regulate the pressure of liquid 101 to between −10 pounds per square inch (PSI) and −1000 PSI. In some implementations, liquid pressure regulator 110 may be configured to regulate the pressure of liquid 101 to between −100 PSI and −300 PSI. Liquid pressure regulator 110 is configured to assist in providing tension to liquid 101 as it traverses through wick 130. In some implementations, regulator valves includes a check-valve and a spring. In some implementations, downstream of liquid pressure regulator 110 is a cavitation prevention region 120. Cavitation prevention region 120 may be configured to inhibit the formation of vapor cavities in liquid 101, thereby maintaining continuous, cavitation-free flowing of liquid 101 through structure 100.

Subsequently, liquid 101 is introduced to wick 130 from cavitation prevention region 120 at receiving end 131 of wick 130. Wick 130 includes wick microstructure-pores, which facilitate transport of liquid 101 by wicking action toward desorption end 139. The microstructure-pores of wick 130 are sized to provide the wicking action to liquid 101. Liquid 101 traverses wick 130 under tension (negative pressure) which enhances the absorption of gas 193 into liquid 101 that is exposed to gas 193. The negative pressure of the liquid 101 traversing wick 130 may be between −10 pounds per square inch (PSI) and −1,000 PSI, for example. In some implementations, the negative pressure of the liquid 101 traversing wick 130 is between −100 PSI and −300 PSI. In some implementations, a fan blows gas 193 over wick 130 to enhance airflow of gas 193 over wick 130 to assist in absorbing a gas (e.g. carbon dioxide) into the liquid 101 that is under tension as it propagates from receiving end 131 to desorption end 139 of wick 130.

Hydraulically coupled to desorption end 139 of wick 130 is hydro-diode region 140. Hydro-diode region 140 may include diode microstructure-pores that are smaller than the wick microstructure-pores. This configuration prevents backflow of liquid 101 and ensures unidirectional movement of liquid 101 toward rewetting zone 150. The liquid 101 pulled into the hydro-diode region 140 may have a higher tension than the liquid traversing wick 130. By way of example, if the tension on liquid 101 traversing wick 130 is −300 PSI, the tension on liquid traversing hydro-diode region 140 may be −350 PSI. This difference in tension may be at least partially dependent on the size of the wick microstructure-pores compared to the diode microstructure-pores.

Rewetting zone 150 is positioned downstream of hydro-diode region 140 and includes textured desorption end 152. As liquid 101 approaches desorption end 139 of wick 130, liquid 101 has absorbed a higher percentage of carbon dioxide. The liquid 101 near desorption end 139 and in hydro-diode region 140 and rewetting zone 150 may have super-Henry absorption of carbon dioxide because of the tension that the liquid 101 is placed under enables a higher absorption of carbon dioxide into liquid 101.

A textured desorption end 152 of rewetting zone 150 is configured to promote desorption of gas 171 from liquid 101. In some implementations, the desorption microstructure-pores in rewetting zone 150 are larger than the diode microstructure-pores of hydro-diode region 140. This may encourage the liquid 101 to flow directionally toward textured desorption end 152 and catch chamber 160. Desorbed gas 171 is collected in catch chamber 160, which encloses textured desorption end 152 of rewetting zone 150.

Catch chamber 160 includes pressure regulated gas vent 170 and liquid drain 190. Catch chamber 160 has a positive pressure. The positive pressure may be at least partially the result of gas desorbing from the liquid at textured desorption end 152. The positive pressure may be 600 PSI, for example. In some implementations, the positive pressure is between 300 PSI and 500 PSI. Pressure regulated gas vent 170 is configured to release gas 171 from catch chamber 160 when the internal pressure of catch chamber 160 reaches a predetermined release threshold. Additionally, drain pressure regulator 180 is configured to release liquid 191 from catch chamber 160 when the internal pressure of catch chamber 160 reaches the predetermined release threshold. The drain pressure regulator 180 and the pressure regulated gas vent 170 may be set to the same pressure release threshold (e.g. 600 PSI) so that a specified pressure can be present in catch chamber 160. Drain pressure regulator 180 is configured to ensure that desorbed liquid 191 is drained from catch chamber 160 when the internal positive pressure exceeds the release pressure.

Accordingly, structure 100 is designed to absorb gas 193 into liquid 101 and then separate the absorbed gas from the liquid by separating the gas from the liquid in a catch chamber. The gas and liquid in the catch chamber can then be directed to separate storage containers.

Figure 1B:
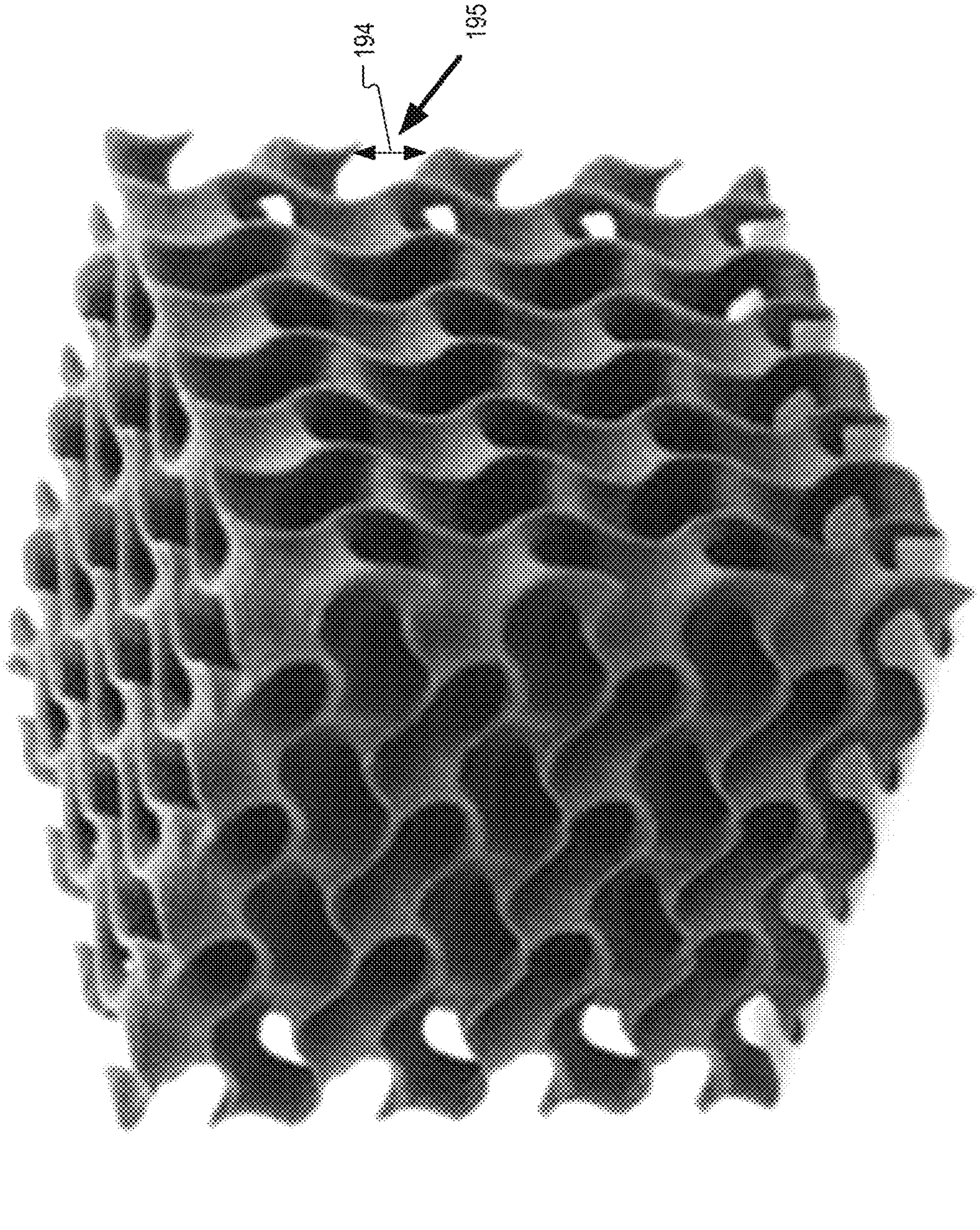
FIG. 1B illustrates a three-dimensional (3D) microstructure that may be used to form a textured surface that may be used, in accordance with aspects of the disclosure.

FIG. 1B illustrates a three-dimensional (3D) microstructure 157 that may be used to form a textured surface that may be used, in accordance with aspects of the disclosure. The cavities or pores 195 of 3D microstructure 157 may have a pore dimension 195 of between 0.1 and 1,000 microns.

This 3D pattern provides a structure for a continuous film of liquid to attach to the microstructures and the liquid can be tensioned in order to increase absorption. 3D microstructure 157 may be made from plastics or ceramics. The surface of 3D microstructure 157 may be hydrophilic.

In some implementations, 3D microstructure 157 are formed by anodizing a metal such as aluminum. The anodizing process may form microstructures on the surface and within the aluminum to give texture to the aluminum, for example. In other implementations, metals or other materials may be wet or dry etched to form 3D microstructure 157. The selection of the etchant (matched to the substrate) may define the different pore sizes in different substrates. 3D microstructure 157 may be 3D printed, in some implementations. In some implementations, the 3D microstructure 157 may be fabricated using advanced manufacturing techniques, such as additive manufacturing or microfabrication, to achieve desired precision and uniformity in cavity and pore dimensions.

Structures similar to 3D microstructure 157 may be used as the microstructure-pores of wick 130, hydro-diode region 140, and rewetting zone 150. The tension of the liquid traversing wick 130 may be between −10 PSI and −500 PSI, for example. The tension of the liquid may be between −60 PSI and −250 PSI, in an implementation. In some implementations, the tension is approximately −100 PSI. In some implementations, the tension is approximately −200 PSI.

The 3D microstructure 157 may be formed to enhance interaction between liquid 101 and gas 193 phases by providing a highly textured and porous surface. The structure comprises a network of interconnected pores 195 that are distributed throughout the microstructure. Accordingly, the pores 195 facilitate efficient gas-liquid contact within structure 100. The pores 195 are defined by pore dimensions 194. Pore dimensions 194 may be tailored to specific applications. The curved nature of the pores 195 contributes to structural integrity and maximizes surface area available for liquid-gas interaction, which plays a significant role in promoting gas absorption.

Figure 1C:
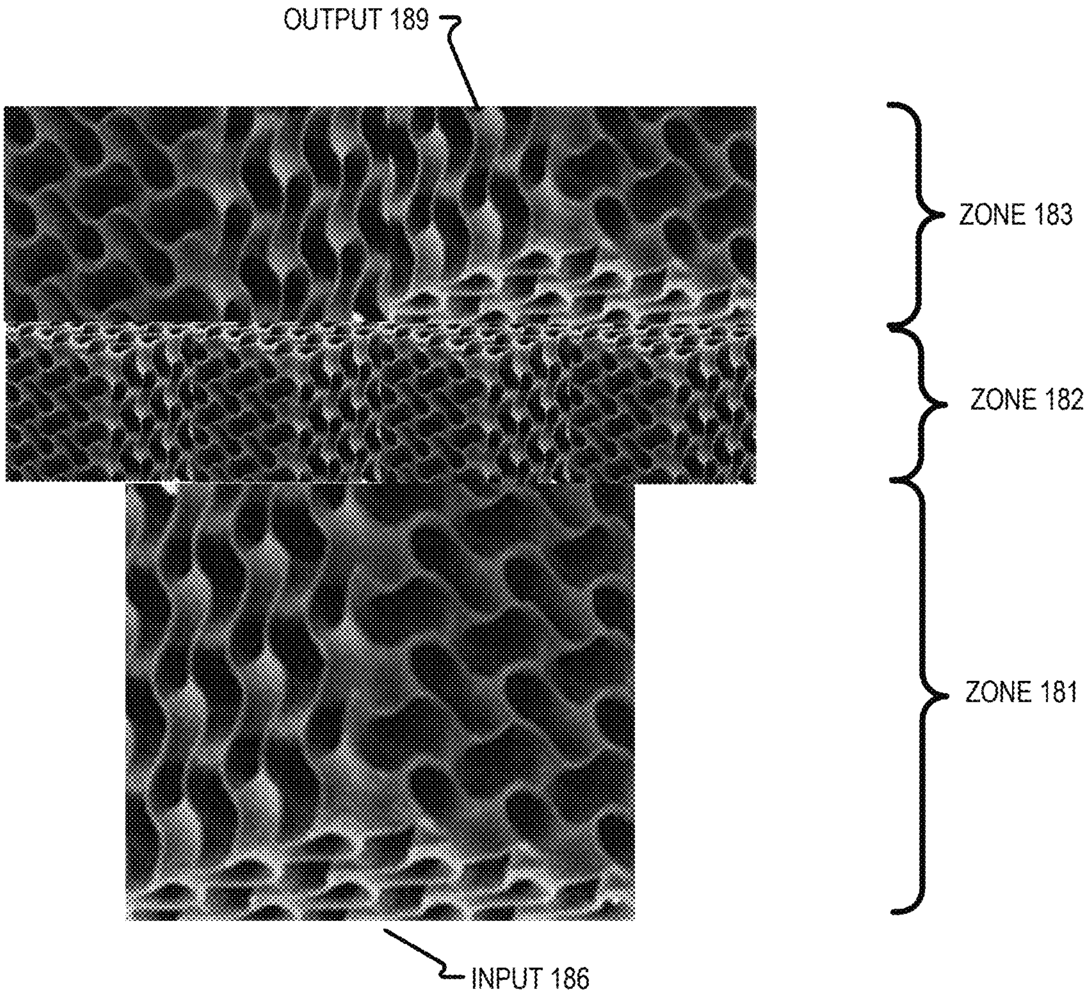
FIG. 1C illustrates a drawing of different sized microstructures coupled together having different pore dimensions, in accordance with aspects of the disclosure.

FIG. 1C illustrates a drawing of different sized microstructures coupled together having different pore dimensions, in accordance with aspects of the disclosure. FIG. 1C shows that channel zone 182 includes a 3D channel structure having the smallest microstructure pores and channel zone 181 includes a 3D channel structure having the largest microstructure pores. Channel zone 183 includes a 3D channel structure having microstructure pores sized between the microstructure pores sizes in channel zone 181 and 182. Despite the different microstructure pores sizes, liquid can flow between the different channel zones. Liquid may flow from input 186 to output 189, for example.

In an implementation, the wick microstructure-pores in wick 130 are between 80 nm and 120 nm, the diode microstructure-pores in hydro-diode region 140 are sized between 10 nm and 30 nm, and the desorption microstructure-pores in rewetting zone 150 are sized between 30 and 50 nm.

Figure 2:
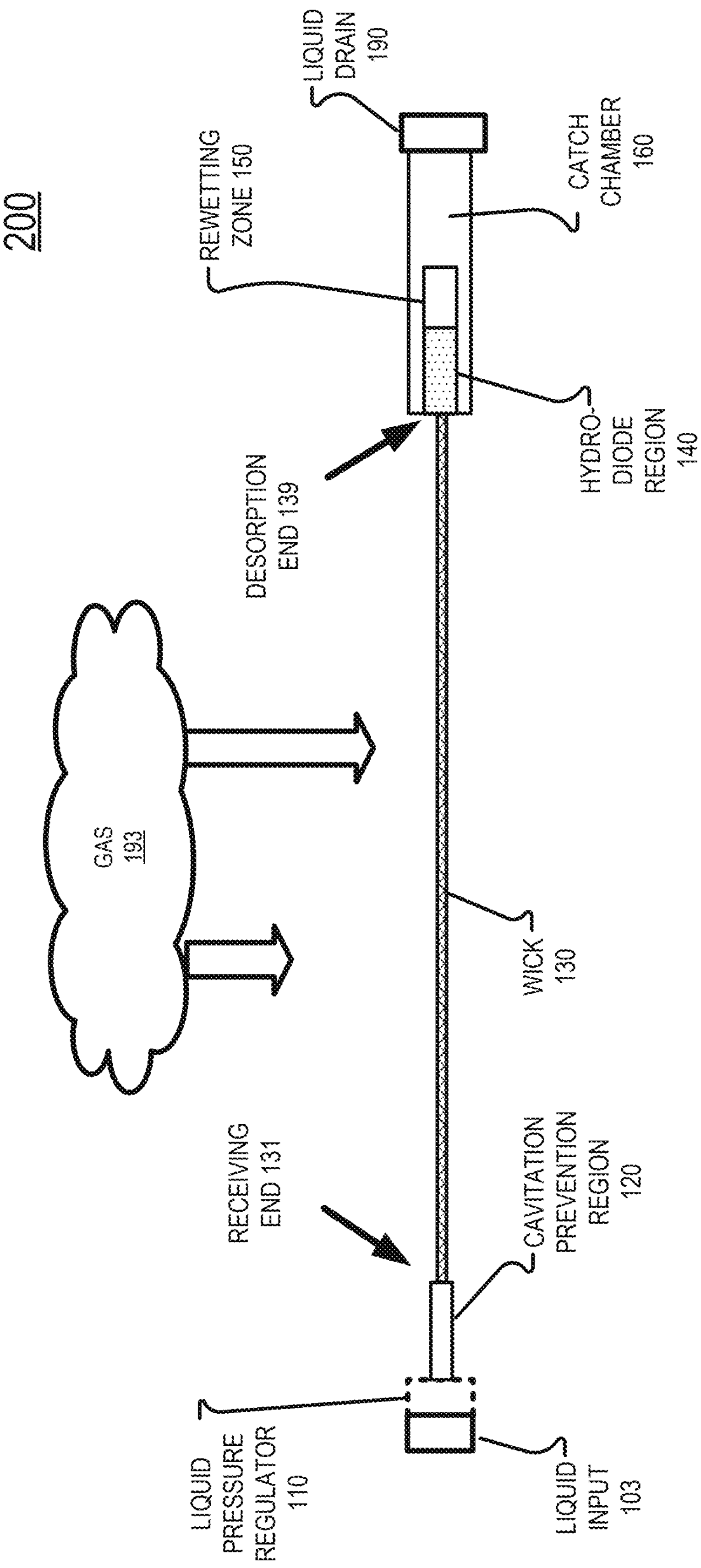
FIG. 2 illustrates a top view of an example carbon dioxide absorption structure, in accordance with aspects of the disclosure.

FIG. 2 illustrates a top view of an example carbon dioxide absorption structure 200, in accordance with aspects of the disclosure. Structure 200 includes liquid input 103, which may be configured to serve as the entry point for a liquid into structure 200. Downstream of liquid input 103, liquid pressure regulator 110 is positioned. Liquid pressure regulator 110 may be configured to regulate the pressure of the liquid entering the system in order to place the liquid in wick 130 under tension.

Following liquid pressure regulator 110 is cavitation prevention region 120. Cavitation prevention region 120 may be configured to prevent cavitation events that could otherwise disrupt liquid flow and compromise system efficiency. Cavitation prevention region 120 may include microstructures such as 3D microstructures 157. The microstructures may be sized to filter out air bubbles in the provided liquid 101 received from liquid input 103.

The liquid then flows from cavitation prevention region 120 into wick 130. Wick 130 includes receiving end 131 and desorption end 139. Receiving end 131 of wick 130 is hydraulically coupled to cavitation prevention region 120 to receive liquid into the wick. Wick 130 may be sized to be narrower than cavitation prevention region 120. Wick 130 may include wick microstructure-pores similar to 3D microstructures 157. The wick microstructure-pores may facilitate capillary movement of liquid, under tension, from receiving end 131 to desorption end 139. Gas 193 encounters the liquid traversing wick 130 and carbon dioxide is absorbed into the liquid at a high rate because the liquid is under tension as it traverses wick 130. The volume of gas 193 absorbed into the liquid may increase as the liquid traverses farther from receiving end 131 toward desorption end 139. At desorption end 139 of wick 130, the liquid is transferred to hydro-diode region 140.

Hydro-diode region 140 may include diode microstructure-pores that are smaller than the microstructure-pores of wick 130. As a result, hydro-diode region 140 prevents backflow of liquid and ensures unidirectional liquid movement toward rewetting zone 150. The top view of example carbon dioxide absorption structure 200 shows that hydro-diode region 140 may be wider than wick 130. Since hydro-diode region 140 has diode microstructure-pores that are smaller than the wick microstructure-pores of wick 130, the wider hydro-diode region 140 may provide similar liquid flow as the narrower wick 130, even though the diode microstructure-pores are smaller than the wick microstructure-pores.

Rewetting zone 150 is positioned downstream of hydro-diode region 140. Rewetting zone 150 may include a textured desorption end that promotes desorption of gas 193 from the liquid in the catch chamber 160. Desorbed liquid is ejected from the texturized desorption end 152 into the catch chamber 160. Rewetting the texturized desorption end 152 pulls additional liquid from the wick microstructure-pores of wick 130, through diode microstructure-pores and the desorption microstructure-pores, toward the textured desorption end to rewet the textured desorption end of rewetting zone 150.

Desorption microstructure-pores in rewetting zone 150 may be larger than the diode microstructure-pores of hydro-diode region 140. Rewetting zone 150 may have a similar width or area as hydro-diode region 140. The desorbed gas is collected in catch chamber 160. Catch chamber 160 encloses rewetting zone 150 and serves as a collection point for desorbed gas and remaining liquid. Catch chamber 160 may be equipped with liquid drain 190, which is configured to drain the separated liquid from the system. Gas 193 may be vented from catch chamber 160 through a pressure regulated gas vent (not shown) to ensure release only upon reaching a predetermined pressure threshold. Catch chamber 160 is sealed so that it can support positive pressure that promotes desorption of gas from the liquid at the textured desorption end 152 of rewetting zone 150.

In some implementations, structure 200 may further include sensors and control valves to monitor and adjust pressure and flow in real time. This configuration of components facilitates efficient liquid flow, gas absorption into the liquid and then separation of the liquid and the gas in the catch chamber.

Figure 3:
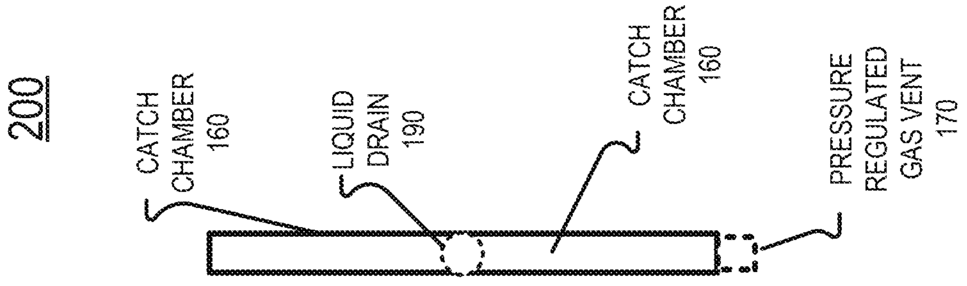
FIG. 3 illustrates a side view of a structure that may be employed in a gas-liquid separation process, in accordance with aspects of the disclosure.

FIG. 3 illustrates a side view of structure 200 that may be employed in a gas-liquid separation process, in accordance with aspects of the disclosure. FIG. 3 shows catch chamber 160, liquid drain 190, and pressure regulated gas vent 170. In some implementations, liquid drain 190 is coupled to a drain pressure regulator 180 (not shown) so that the liquid flow is controlled based on internal pressure conditions within catch chamber 160. Pressure regulated gas vent 170 may be positioned to release collected gas from catch chamber 160 when the internal gas pressure reaches a predefined release threshold.

Figure 4:
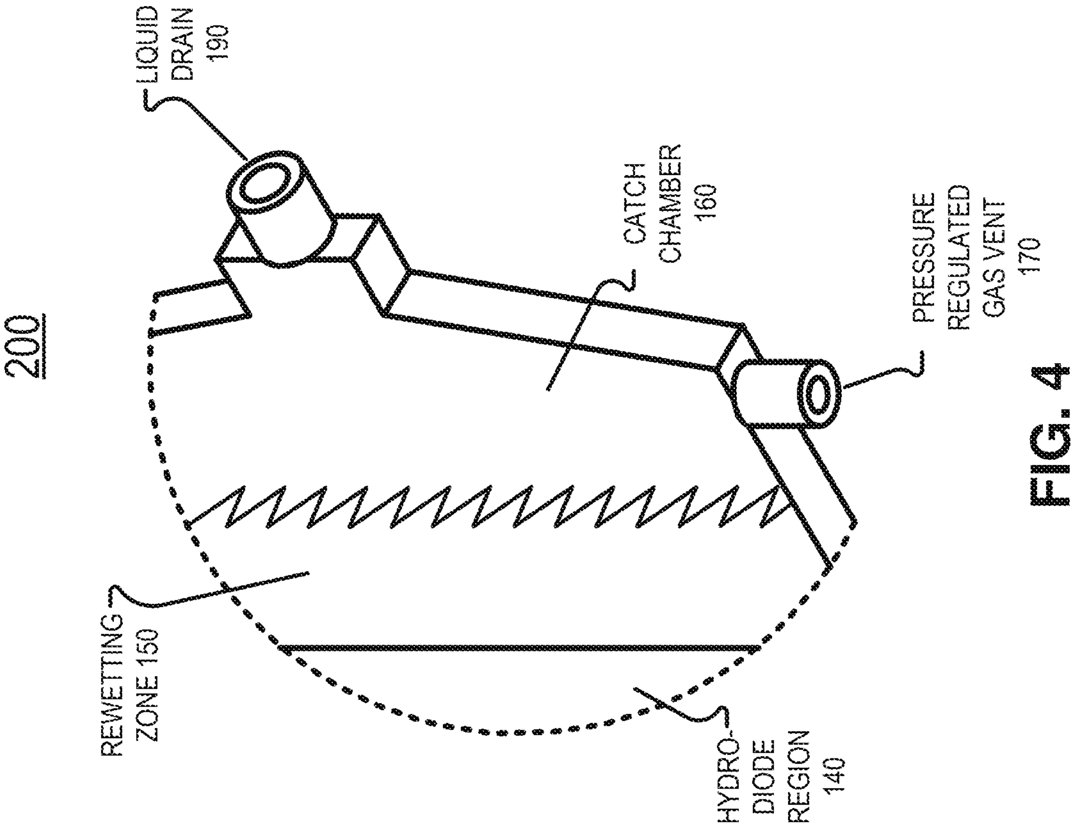
FIG. 4 illustrates a perspective view of a portion of the structure illustrated in FIG. 3, in accordance with aspects of the disclosure.

FIG. 4 illustrates a perspective view of a portion of structure 100, in accordance with aspects of the disclosure.

FIG. 5A illustrates a block diagram of a portion of an example structure 500 configured to separate gas 171 from liquid at a textured desorption end 552 of rewetting zone 150, in accordance with aspects of the disclosure.

As liquid flows from wick 130, through hydro-diode region 140, the liquid encounters rewetting zone 550 having a diode end 551 opposite a textured desorption end 552. In the illustration of FIG. 5A, the textured desorption end 552 includes a sawtooth structure. The sawtooth structure may include structures similar to 3D microstructure 157 that are shaped as sawteeth 553. The diode end 551 of rewetting zone 550 is hydraulically coupled to hydro-diode region 140. As the liquid flows toward textured desorption end 552, the liquid encounters the tips of the sawtooth 553.

FIG. 5B illustrates a liquid droplet 556 forming at the tip of the sawtooth. FIG. 5C illustrates liquid droplet 557. The tip of the sawtooth is configured to reduce the hydraulic pressure at the tip of the sawtooth and to destabilize the water film of the droplet at the tip. Liquid droplet 557 has less tension than liquid droplet 556. FIG. 5D illustrates liquid drop 558. Liquid droplet 558 has less tension than liquid droplet 557 and therefore is closer to bursting. FIG. 5E illustrates a bursting droplet 559. As the liquid is separated from the microstructures of textured desorption end 552, it can no longer sustain the high tension that allowed for high absorption of carbon dioxide when the liquid was under tension within the microstructures. In other words, the microstructures in wick 130, hydro-diode region 140, and rewetting zone 150/550 prevent the liquid from cavitating throughout the system until the liquid reaches the tip of the sawteeth 553. Thus, the carbon dioxide desorbs from the liquid in a bursting event at the tip of sawtooth 553.

At the bursting event, the gas (e.g. carbon dioxide) from the droplet is released into catch chamber 160 while the liquid in the droplet also enters catch chamber 160. The newly added gas from the bursting event adds to the pressure in catch chamber 160 and the gas 171 is vented to a gas storage container via pressure regulated gas vent 170. The desorbed liquid in catch chamber 160 is separately drained to a liquid storage container as desorbed liquid 191 via liquid drain 190 that may be regulated by a drain pressure regulator 180.

After the burst event of droplet 559, a new droplet forms on the tip of sawtooth 553 (as shown in FIG. 5B) and the process repeats as more liquid is pulled from the wick 130, through the hydro-diode region 140 to the textured desorption end 552 of rewetting zone 550. While the sawtooth texture is illustrated for example purposes, other convex structures can be used to encourage the bursting of the droplets. In some implementations, the textured desorption surface 152 includes convex alternating with concave surfaces so that the textured desorption surface 152 has surfaces with varying radii. The liquid droplets are then more likely to form on the surfaces with the smaller radii, which promotes the bursting event to separate the gas from the liquid.

The positive air pressure with catch chamber 160 also encourages the bursting event of liquid droplets on the tip of the sawteeth 553. In some implementations, the tip of sawtooth 553 is hydrophilic to encourage bursting of the droplets. In some implementations, all or most of sawtooth 553 is hydrophilic to encourage bursting of the droplets.

Structure 500 may include a heating element 543 disposed in proximity to textured desorption end 552 to promote gas release from droplets of liquid. The heating element 543 may be a resistive heating element that current is run through. Heating element 543 may follow the contours of textured desorption end 552 and be placed just beneath the surface of textured desorption end 552. Processing logic may control and modulate the current running through the heating element via switch 545. Heating the tips of textured desorption end 552 heats the droplets of liquid. The increase in temperature in the droplets decreases the volume of gas the droplets can retain and thus the droplets are more likely to experience a bursting even that separates the gas from the liquid.

In some implementations, one or more vibrators 547 may be positioned proximate to textured desorption end 552 to vibrate the tips of textured desorption end 552. Vibrating the tips of textured desorption end 552 may also encourage bursting events of the liquid droplets.

An air pump 520 may be coupled to catch chamber 160 to initialize or maintain desired pressure conditions inside catch chamber 160. In some implementations, air pump 520 provides the initial positive pressure into catch chamber 160 to initiate the bursting of liquid droplets. From there, the bursting of liquid droplets may keep the pressure in catch chamber 160 at the desired pressure, which perpetuates the flow of liquid toward catch chamber 160. However, the air pump 520 may supplement the pressure in catch chamber 160, as needed. In some implementations, a sensor monitors the pressure in catch chamber 160 and air pump 520 is driven in response to the pressure measurements on that sensor.

Figure 6B:
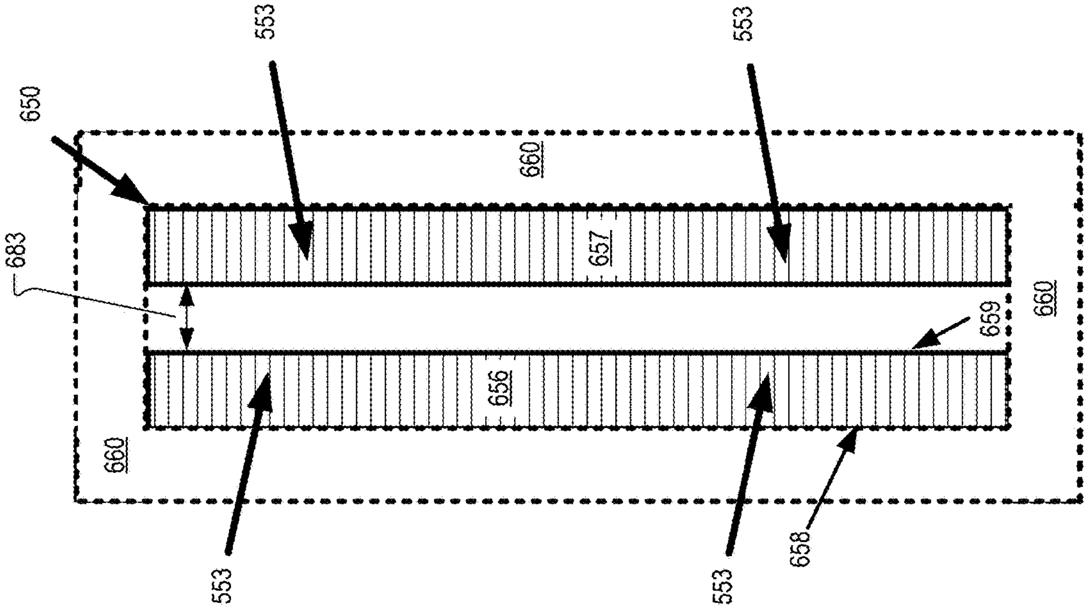
FIG. 6B illustrates a front view of a rewetting zone that includes a first plate and a second plate, in accordance with aspects of the disclosure.
Figure 6A:
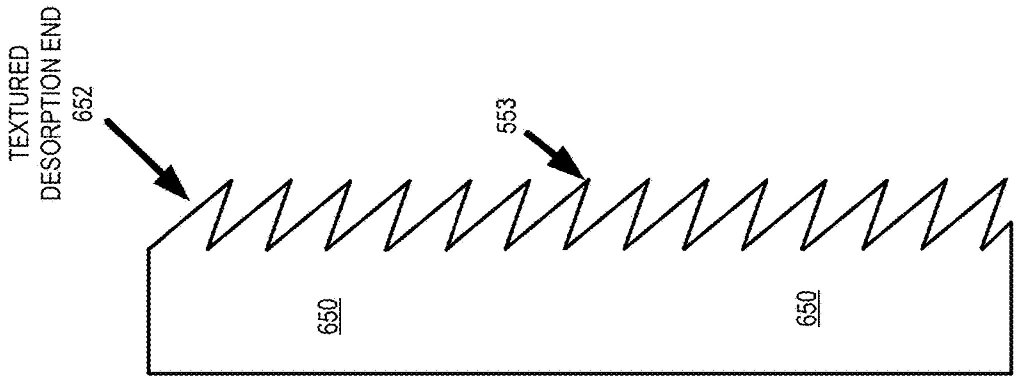
FIG. 6A illustrates a side view of an example rewetting zone including sawteeth on a textured desorption end of a rewetting zone, in accordance with aspects of the disclosure.

FIG. 6A illustrates a side view of an example rewetting zone 650 including sawteeth 553 on a textured desorption end 652 of rewetting zone 650, in accordance with aspects of the disclosure. FIG. 6B illustrates a front view of a rewetting zone 650 that includes a first plate 656 and a second plate 657, in accordance with aspects of the disclosure. In the example of FIG. 6B, rewetting zone 650 includes a first plate 656 spaced apart from a second plate 657 by a dimension 683. The desorption microstructure-pores are formed on both sides 658 and 659 of the first plate 656 and the second plate 657 and the sawtooth structures 553 are formed on the textured desorption end 652 of the first plate and the second plate. A catch chamber barrier 660 may be formed around first plate 656 and second plate 657.

Figure 7A:
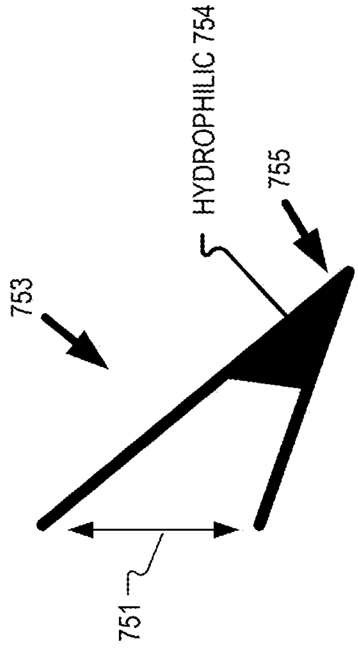
FIGS. 7A-7B illustrate an example sawtooth that may be part of a sawtooth structure, in accordance with aspects of the disclosure.

FIG. 7A illustrates an example sawtooth 753 having a base dimension 751 and a tip 755. The tip 755 is covered by a hydrophilic material 754, in FIG. 7A. In an implementation, tips of sawtooth 553 in the sawtooth structure are hydrophobic to promote the gas desorption of the gas from the liquid on the sawteeth and the sawtooth structures are hydrophilic except for the hydrophobic tips of the sawteeth.

Figure 7B:
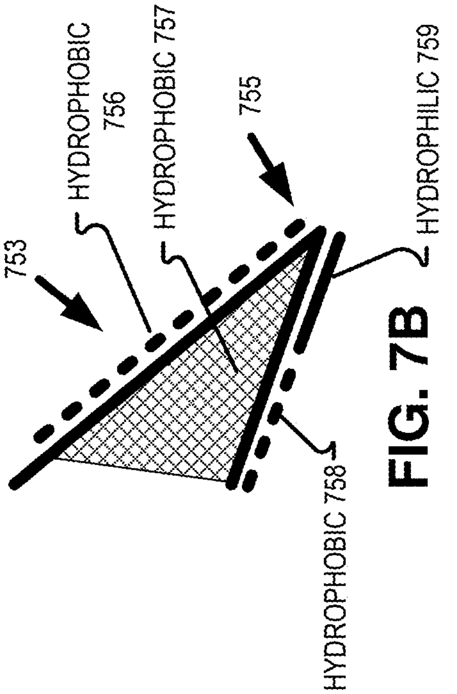

FIG. 7B illustrates an example zoomed-in version of tip 755 of sawtooth 753. FIG. 7B illustrates that a tip 755 may be hydrophobic along dashed lines 756 and 758 along with being hydrophobic on sides of sawtooth 753. A portion of the underside of sawtooth 753 is hydrophilic along solid line 759 to encourage the liquid droplets to form along the hydrophilic line 759. In an implementation, the tips of the sawtooth have a radius of less than 50 microns so that the point of the sawtooth is sharp enough to induce a bursting event of droplets formed on the tip.

Figure 8:
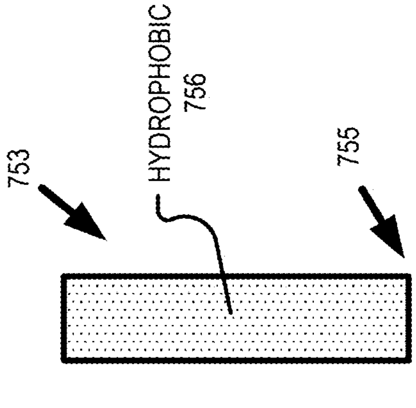
FIG. 8 illustrates a top view of a sawtooth including a hydrophobic region, in accordance with aspects of the disclosure.

FIG. 8 illustrates a top view of sawtooth 753 showing the hydrophobic region 756 that is illustrated as a dashed line in FIG. 7B.

Figure 9:
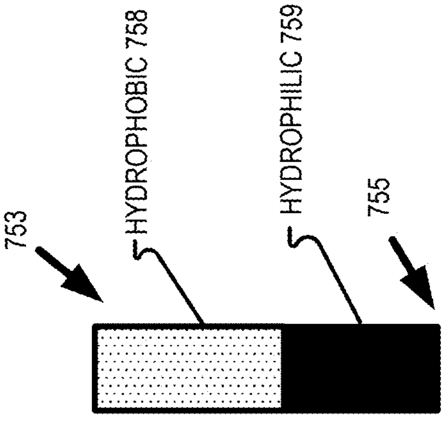
FIG. 9 illustrates a bottom view of a sawtooth including a hydrophobic region and a hydrophilic region, in accordance with aspects of the disclosure.

FIG. 9 illustrates a bottom view of sawtooth 753 showing the hydrophobic region 758 and hydrophilic region 759 that are illustrated in FIG. 7B.

Figure 10:
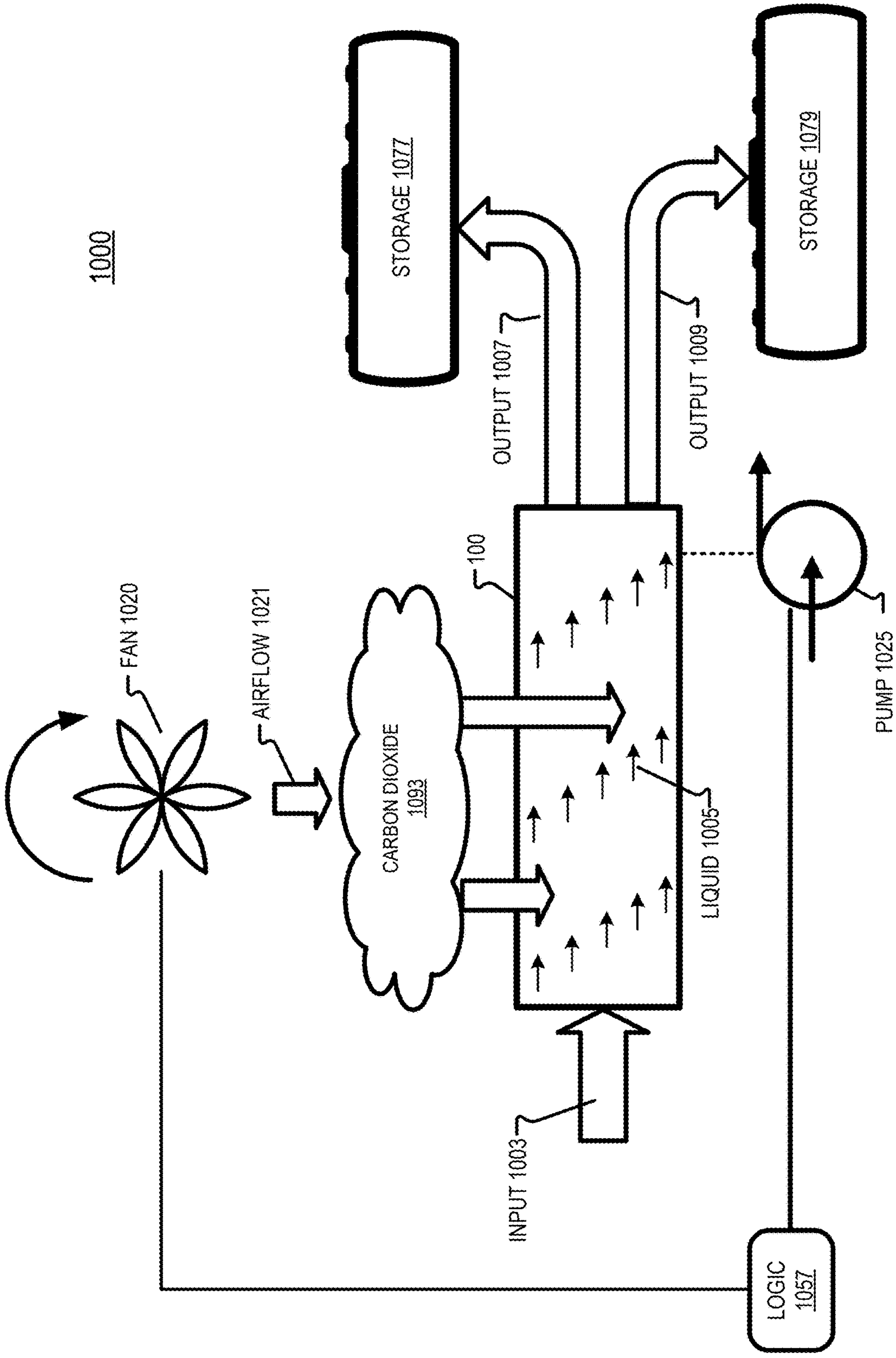
FIG. 10 illustrates a system configured to absorb carbon dioxide into a liquid traversing a wick of one or more structures, in accordance with aspects of the disclosure.

FIG. 10 illustrates a system 1000 configured to absorb carbon dioxide 1093 into liquid 1005 traversing a wick of one or more structures 100, in accordance with aspects of the disclosure. Once the carbon dioxide 1093 is absorbed into the liquid, system 1000 is configured to separate the carbon dioxide from the liquid in a desorption process that generates a liquid output 1007 and a gas output 1009.

System 1000 may include an input 1003 to receive liquid 1005. Absorption of the carbon dioxide 1093 into liquid 1005 may be assisted by airflow 1021 generated by one more fans 1020. Fan 1020 may be configured to establish airflow 1021 across wick of structures 100 to expose the liquid traversing the wick to increased airflow. In some implementations, the airflow 1021 is provided by an exhaust vent of an engine.

System 1000 may also include an initializing pump 1025 configured to pressurize the catch chambers 160 to an initial gas pressure approaching the release pressure of the pressure regulated gas vent 170. Initializing pump 1025 may be configured to maintain a desired pressure range that is close to the threshold pressure of pressure regulated gas vent 170 and drain pressure regulator 180.

Liquid output 1007 may provide liquid 191 to storage container 1077 and gas output 1009 may provide gas 171 to a gas storage container 1079. Containers 1077 and 1079 may be configured to store the respective outputs until further use or disposal. A pressure regulated gas vent 170 may release the gas into a gas collection container 1079 when a gas pressure inside the catch chamber reaches a release pressure of the pressure regulated gas vent 170. The gas collection container 1079 may be coupled to the pressure regulated gas vent 170 to receive the gas 171. Drain pressure regulator 180 may be configured to drain the desorbed liquid in the catch chamber through liquid drain 190 when a catch chamber pressure of the catch chamber 160 exceeds the release pressure. The pressure regulated gas vent and the drain pressure regulator may have the same release pressure.

System 1000 may be controlled by processing logic 1057. Processing logic 1057 may be configured to control the operation of fan 1020 and pump 1025.

Figure 11:
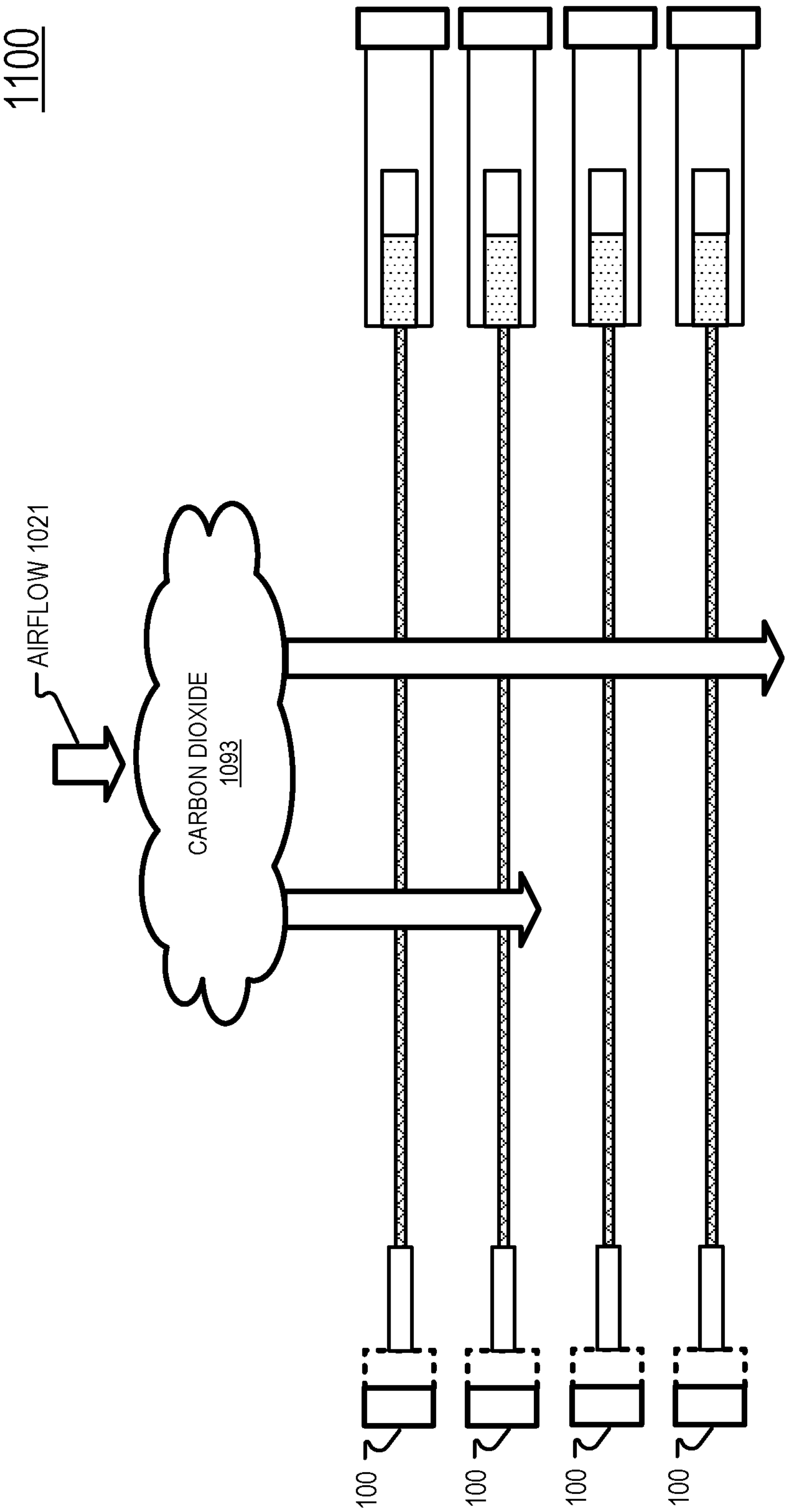
FIG. 11 illustrates a system that utilizes multiple structures that are arranged together, in accordance with aspects of the disclosure.

FIG. 11 illustrates a system 1100 that utilizes multiple structures 100 that are arranged in parallel, in accordance with aspects of the disclosure. One or more fans may drive airflow 1021 over the wicks of the multiple structures 100. The devices may be networked together to deposit the separated gas in their catch chambers into the same gas storage container and deposit the liquid in the same liquid storage container. In some implementations, structures 100 or system 1100 is positioned proximate to a component that generates carbon dioxide 1093. For example, structures 100 or system 1100 may be positioned to receive exhaust gases from a petrol engine. In some implementation, system 1100 receives exhaust gas from a gas engine. The gas engine may be installed in a marine vessel, a pickup truck, or a generator, for example. In some implementation, system 1100 receives exhaust gas from a diesel engine. The diesel engine may be installed in a marine vessel, a semi-truck, a pickup truck, or a generator, for example.

Figure 12:
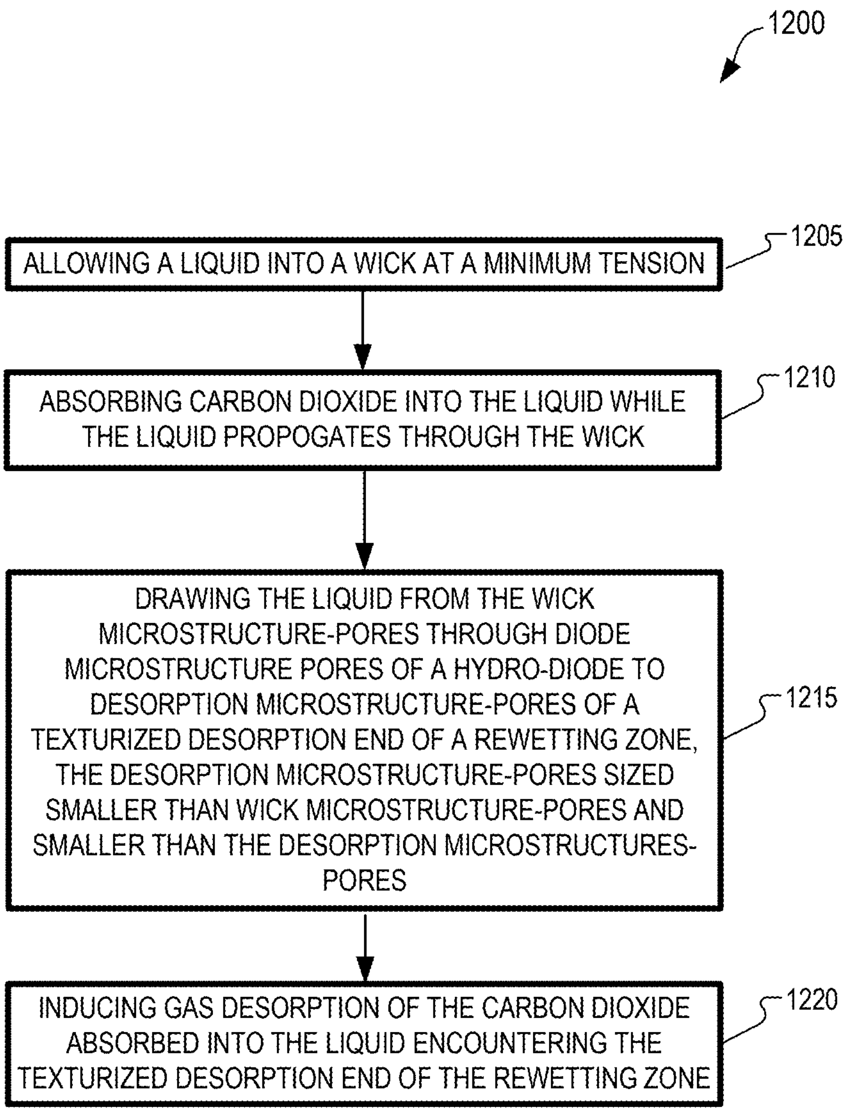
FIG. 12 illustrates an example flowchart of a process that may be employed to achieve carbon dioxide absorption in a liquid and then separating the carbon dioxide from the liquid into separate storage containers, in accordance with aspects of the disclosure.

FIG. 12 illustrates an example flowchart of a process 1200 that may be employed to achieve carbon dioxide absorption in a liquid and then separating the carbon dioxide from the liquid into separate storage containers, in accordance with aspects of the disclosure. The order in which some or all of the process blocks appear in process 1200 should not be deemed limiting. Rather, one of ordinary skill in the art having the benefit of the present disclosure will understand that some of the process blocks may be executed in a variety of orders not illustrated, or even in parallel.

In process block 1205, the process may begin by allowing a liquid into a wick under a minimum tension. The wick 130 may include wick microstructure-pores.

In process block 1210, carbon dioxide is absorbed into the liquid propagating through the wick. The wick microstructure-pores of the wick may provide a relatively large surface area for interaction between the liquid and surrounding gas while also retaining tension on the liquid traversing the wick. Thus, the tension of the liquid and the increased surface area of the liquid provided by the wick enhances absorption of carbon dioxide into the liquid.

In process block 1215, the liquid is drawn from the wick microstructure-pores through diode microstructure-pores of a hydro-diode region 140 to desorption microstructure-pores of the texturized desorption end of a rewetting zone. The diode microstructure-pores are sized smaller than the wick microstructure-pores.

In process block 1220, gas desorption of the carbon dioxide absorbed into the liquid is induced as the liquid encounters the texturized desorption end of the rewetting zone. The carbon dioxide is desorbed into a catch chamber and the liquid is collected in the catch chamber subsequent to detachment from the texturized desorption end of the rewetting zone.

In implementations of process 1200, the texturized desorption end may include sawtooth structures or other protrusions that promote release of carbon dioxide from the liquid. Tips of sawteeth in the sawtooth structure may be hydrophobic to promote the desorption of the carbon dioxide from the liquid on the sawteeth. The sawtooth structures may be hydrophilic except for the hydrophobic tips of the sawteeth.

In some implementations of process 1200, the wick microstructure-pores are sized between 10 nm and 300 nm and the diode microstructure-pores are sized between 5 nm and 295 nm.

In some implementations of process 1200, a desorption end of the wick is embedded in the diode microstructure-pores to prevent back-pressure propagation of the liquid from the rewetting zone back toward a receiving end of the wick that is opposite the desorption end of the wick.

In an implementation, process 1200 further includes collecting the carbon dioxide into a gas collection container through a pressure regulated gas vent of the catch chamber and collecting the liquid into a liquid collection container through a drain pressure regulator, the pressure regulated gas vent and the drain pressure regulator having the same release pressure.

The term "processing logic" (e.g. processing logic 1057) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), $I^2C$ (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A system comprising:

a liquid input region to receive a liquid;

a wick including wick microstructure-pores, wherein the wick includes a desorption end opposite a receiving end receiving the liquid from the liquid input region;

a liquid pressure regulator disposed between the liquid input region and the receiving end of the wick, wherein the liquid pressure regulator is configured to regulate a liquid pressure of the liquid exposed to the receiving end of the wick;

a hydro-diode region including diode microstructure-pores sized smaller than the wick microstructure-pores, wherein the hydro-diode region is hydraulically coupled to the desorption end of the wick;

a rewetting zone including a textured desorption end opposite a diode end coupled to the hydro-diode region, wherein the rewetting zone includes desorption microstructure-pores sized larger than the diode microstructure-pores; and a catch chamber enclosing the textured desorption end of the rewetting zone, wherein the textured desorption end of the rewetting zone is configured to induce gas desorption of a gas from the liquid into the catch chamber, wherein the catch chamber includes a pressure regulated gas vent to collect the gas in the catch chamber up to a release pressure, and wherein the catch chamber includes a liquid drain configured to drain desorbed liquid that has been separated from the gas.

2. The system of claim 1, wherein the textured desorption end of the rewetting zone includes a sawtooth structure, wherein tips of sawteeth in the sawtooth structure are hydrophobic to promote the gas desorption of the gas from the liquid on the sawteeth, wherein the sawtooth structures are hydrophilic except for the hydrophobic tips of the sawteeth.

3. The system of claim 2, wherein the rewetting zone includes a first plate spaced apart from a second plate, and wherein the desorption microstructure-pores are formed on both sides of the first plate and the second plate, the sawtooth structures formed on a rewetting end of the first plate and the second plate.

4. The system of claim 2, wherein the tips of the sawtooth have a radius of less than 50 microns.

5. The system of claim 1, wherein the hydro-diode region has a larger liquid throughput region for the liquid than a wick liquid throughput region of the wick.

6. The system of claim 1, wherein the pressure regulated gas vent releases the gas into a gas collection container when a gas pressure inside the catch chamber reaches a release pressure of the pressure regulated gas vent, the gas collection container coupled to the pressure regulated gas vent to receive the gas.

7. The system of claim 1 further comprising:

an initializing pump configured to pressurize the catch chamber to an initial gas pressure approaching the release pressure of the pressure regulated gas vent.

8. The system of claim 1, wherein the wick microstructure-pores are sized between 10 nm and 300 nm, and wherein the diode microstructure-pores are sized between 5 nm and 295 nm.

9. The system of claim 1, wherein the wick microstructure-pores are between 80 nm and 120 nm, and wherein the diode microstructure-pores are sized between 10 nm and 30 nm, and wherein desorption microstructure-pores are sized between 30 and 50 nm.

10. The system of claim 1, wherein the gas is carbon dioxide, and wherein the desorbed liquid includes water.

11. The system of claim 1, wherein the desorption end of the wick is embedded in the diode microstructure-pores to prevent back-pressure propagation of the liquid from the rewetting zone back toward the receiving end of the wick.

12. The system of claim 1 further comprising:

a drain pressure regulator configured to drain the desorbed liquid through the liquid drain when a catch chamber pressure of the catch chamber exceeds the release pressure, the pressure regulated gas vent and the drain pressure regulator having the same release pressure.

13. The system of claim 1 further comprising:

a heating element configured to heat the textured desorption end to further promote the desorption of the gas from the liquid.

14. The system of claim 1 further comprising:

a vibrator configured to vibrate the textured desorption end of the rewetting zone to further promote the desorption of the gas from the liquid.

15. A structure comprising:

wick microstructure-pores;

diode microstructure-pores sized smaller than the wick microstructure-pores;

a rewetting zone including desorption microstructure-pores sized larger than the diode microstructure-pores; and a catch chamber enclosing a textured desorption end of the rewetting zone, wherein the textured desorption end of the rewetting zone is configured to induce gas desorption of a gas from liquid into the catch chamber, wherein desorbed liquid is ejected from the texturized desorption end into the catch chamber, and wherein rewetting the texturized desorption end pulls additional liquid from the wick microstructure-pores, through the diode microstructure-pores and the desorption microstructure-pores, toward the textured desorption end to rewet the textured desorption end.

* * * * *